United States Patent
Mori et al.

(10) Patent No.: US 6,631,464 B1
(45) Date of Patent: Oct. 7, 2003

(54) INSTRUCTION PIPELINE WITH A BRANCH PREFETCH WHEN THE BRANCH IS CERTAIN

(75) Inventors: Tsuyoshi Mori, Ayase (JP); Seishi Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/826,990

(22) Filed: Jun. 10, 1993

Related U.S. Application Data

(63) Continuation of application No. 07/457,561, filed on Dec. 27, 1989, now abandoned.

(51) Int. Cl.[7] .................................................. G06F 9/00
(52) U.S. Cl. ...................... 712/234; 712/207; 712/23
(58) Field of Search ......................... 712/23, 215, 233, 712/234, 207

(56) References Cited

U.S. PATENT DOCUMENTS

| | | | | |
|---|---|---|---|---|
| 4,373,180 A | * | 2/1983 | Linde ........................ | 395/375 |
| 4,435,756 A | * | 3/1984 | Potash ........................ | 395/375 |
| 4,827,402 A | * | 5/1989 | Wada ........................ | 395/375 |
| 4,847,755 A | * | 7/1989 | Morrison et al. ........... | 712/203 |
| 4,853,840 A | * | 8/1989 | Shibuya ...................... | 395/375 |
| 4,954,982 A | * | 9/1990 | Tateishi et al. ............. | 395/425 |
| 4,974,155 A | * | 11/1990 | Dulong et al. .............. | 395/375 |
| 4,977,496 A | * | 12/1990 | Onishi et al. ............... | 712/237 |
| 5,203,006 A | * | 4/1993 | Taniai ........................ | 711/213 |
| 5,237,664 A | * | 8/1993 | Usami ........................ | 712/239 |

FOREIGN PATENT DOCUMENTS

| JP | 57-150040 | 9/1982 |
|---|---|---|
| JP | 60-105050 | 6/1985 |

OTHER PUBLICATIONS

Iacobovici et al. Balanced Microprocessor Design Keeps Performance Peaked, May 1989, pp. 371–375.*

Miyata et al., "The TX1 32–Bit Microprocessor: Performance Analysis and Debugging Support", IEEE Micro, vol. 8, No. 2, pp. 37–46 Apr. 1, 1988.

Gonzalez et al., "Branch Mechanism for Program Loops", IBM Technical Disclosure Bulletin, vol. 25, No. 9, Feb. 1983, pp. 4569–4571.

* cited by examiner

*Primary Examiner*—Larry D. Donaghue
(74) *Attorney, Agent, or Firm*—Staas & Halsey LLP

(57) ABSTRACT

An instruction fetch control system prefetches a branch instruction in a pipeline system and fetches a branch target instruction of the branch instruction. The control system comprises a first branch judgement circuit for conducting a branch condition judgement in a stage prior to the branch judgement stage in which a second and original branch judgement of the branch instruction is conducted, and a circuit for starting a prefetch of instructions following said branch target instruction without waiting for the branch judgement stage where the first branch judgement circuit judges that the branch is successful.

6 Claims, 15 Drawing Sheets

| FLAG 41 | FLAG 11 | BRANCH JUDGEMENT CIRCUIT 23 | SIGNALS AND REGISTERS TO BE SELECTED | EXPLANATION OF STATE |
|---|---|---|---|---|
| OFF | OFF | OFF | SIGNAL ① AND REGISTER 30 | ORDINARY CASE |
| OFF | OFF | ON | SIGNAL ③ AND REGISTER 14 | CONDITION BRANCH IS SUCCESSFUL |
| OFF | ON | OFF | SIGNAL ② AND REGISTER 9 | NON-CONDITION BRANCH INSTRUCTION |
| OFF | ON | ON | SIGNAL ② AND REGISTER 14 | CONDITION BRANCH IS SUCCESSFUL (PRIORITY) |
| ON | OFF | OFF | (IMPOSSIBLE CASE) | E STATE OF NON-CONDITION BRANCH INSTRUCTION |
| ON | OFF | ON | SIGNAL ① AND REGISTER 30 | |
| ON | ON | OFF | (IMPOSSIBLE CASE) | |
| ON | ON | ON | SIGNAL ② AND REGISTER 9 | NON-CONDITION BRANCH INSTRUCTION |

| TIMING | (1) | (2) | (3) | (4) | (5) | (6) | (7) | (8) | (9) | (10) | (11) |
|---|---|---|---|---|---|---|---|---|---|---|---|
| INSTRUCTION 1 | D | A | T | B | E | W | | | | | |
| INSTRUCTION 2 | | D | A | T | B | E | W | | | | |
| INSTRUCTION 3 | | | D | A | T | B | E | W | | | |
| INSTRUCTION 4 | | | | D | A | T | B | E | W | | |
| INSTRUCTION 5 | | | | | D | A | T | B | E | W | |
| BRANCH INSTRUCTION B | | | | | BRANCH PREDICTION | D | A | T | B | E | W |
| | | | | | | | | | | BRANCH JUDGEMENT | |
| FLAG 51 | | UPDATE | NOT UPDATE | NOT UPDATE | NOT UPDATE | NOT UPDATE | NOT UPDATE | | | | |
| FLAG 52 | | | UPDATE | NOT UPDATE | NOT UPDATE | NOT UPDATE | NOT UPDATE | NOT UPDATE | | | |
| FLAG 53 | | | | UPDATE | NOT UPDATE | NOT UPDATE | NOT UPDATE | NOT UPDATE | NOT UPDATE | | |
| FLAG 54 | | | | | UPDATE | NOT UPDATE | NOT UPDATE | NOT UPDATE | NOT UPDATE | NOT UPDATE | |
| FLAG 55 | | | | | | UPDATE | NOT UPDATE | NOT UPDATE | NOT UPDATE | NOT UPDATE | |

INSTRUCTION PIPELINE WITH A BRANCH PREFETCH WHEN THE BRANCH IS CERTAIN

This application is a continuation of application Ser. No. 07/457,561, filed Dec. 27, 1989, now abandoned.

BACKGROUND OF THE INVENTION

This invention relates to a control system for fetching an instruction group following a branch target instruction when a branch instruction is executed in a computer system using a one-cycle pipeline system and more particularly, to an instruction fetching control system for performing a prior branch judgement by judging whether a condition judgement can be performed in a cycle preceding a branch judgement cycle in which the branch instruction is executed.

FIG. 1 shows a view for explaining an execution of a branch instruction in a prior-art one-cycle pipeline system. The numbers (1) to (12) at the top of the drawing represent respective timings of machine cycles and process part symbols D, A, T, B, E, and W of respective instructions represent respective processing states (which are also called "cycles" or stages hereinafter) in the pipeline control.

D indicates a decoding cycle for decoding an instruction to be executed. A is an address calculating cycle for performing an address calculation to fetch the branch target instruction, T is an address translating cycle for translating a logical address into a real address, B is a cycle for fetching a branch target instruction, E is a branch judging cycle for performing a judgement as to whether the branch condition is successful or not and W is a cycle for storing an arithmetic operation result. These cycles are well known.

In the pipeline system, an instruction to be executed is prefetched. The prefetch of the executed instruction is also conducted in a pipeline manner. The periods for period part symbols IA, IT and IB in the instruction prefetch pipeline in the lower part of FIG. 1 represent process cycles for prefetching an instruction following the branch instruction and IA*, IT* and IB* represent process cycles for prefetching the instruction following the branch target instruction. For example, address calculating cycle IA, address translating cycle IT and cycle IB for fetching data from a buffer in the instruction prefetch pipeline shown in process IPP, is for fetching fetching instruction (N)+3 where the branch of branch instruction B is not successful.

In FIG. 1, symbols "Next", shown in the lower part of FIG. 1, represent the kind of the instruction to be prefetched. These symbols show that the instruction (also called "Next side" of the part) following the branch instruction is prefetched. "Target" indicates that an instruction (called "Target side" of the part) following the branch target instruction is prefetched and "(Next)" shows the case in which the instruction following the branch instruction is prefetched and the case in which the instruction is not fetched are selected.

Branch instruction (B) is first executed in the example shown in FIG. 1 and instruction sets (N), (N)+1, (N)+2 and (N)+3 following the branch instruction (B) are then executed sequentially. The branch condition is successful in the branch judging cycle (E state) of branch instruction (B) in timing step (5) and branch target instruction (T) and instruction sets (T) (T)+1, (T)+2, . . . following the branch target instruction are executed. FIG. 1 shows the case where the number of branch target instructions (T), (T)+1, (T)+2 obtained by one time fetch of the branch instruction carried out during B state of branch instruction (B) is three and the branch is carried out depending on the result of the branch judgement during E state of branch instruction (B) and the execution of branch target instructions (T), (T)+1, (T)+2 is started smoothly.

In a pipeline system, as recited above, an instruction prefetch is processed as a pipeline. Thus, it is necessary to determine the fetch address at which an address calculation IA should be conducted in a stage which is two cycle prior to stage IB in which a prefetch of an instruction is actually carried out, as shown in FIG. 2. FIG. 2 shows a view for explaining an instruction prefetch pipeline. Period part symbols IA, IT, IB show respective process stages. IA designates an address calculation cycle (ADRS), IT represents an address translation cycle (TLB/TAG) and IB represents an instruction fetching cycle (FETCH).

Generally, i.e., without being limited to a branch instruction, it is necessary to determine the addresses of instructions "Next 1" and "Next 2" to be prefetched in the IA cycle two cycles prior to the IB cycle in which an instruction is actually fetched.

Where the pipeline process is carried out as shown in FIG. 1 and an instruction prefetch is executed in the form shown in FIG. 2, then, there is the problem that an instruction prefetch, which should be carried out in the same cycle at timing (5) in FIG. 1 as branch judging cycle (E state) of branch instruction (B) in FIG. 1 or in the next cycle (timing (6) and (7) in FIG. 1), is conducted as to a part ("target side") following branch target instruction (T) or a part ("next side") following branch instruction (B).

As shown in FIG. 3, in the example (No. 1) where a target side instruction fetch does not exist when the branch target instruction starts, the branch condition of branch judging cycle (E state) of branch instruction (B) is successful and only T of one machine instruction of the branch target occurring during B state (timing (4) in FIG. 3) is fetched, branch target instruction (T) can then be executed during timing (5) but, at this time instruction (T)+1 of Target Side is not yet fetched, and thus, execution of instruction (T)+1 cannot start during timing (6).

In order to solve this problem, the means for fetching the branch target instruction (T) together with instructions (T)+1, (T)+2 . . . , following the branch target instruction in B state of branch instruction (B) is considered. In this case, the amount of instruction which can be fetched by one fetch operation, is about 1 to 2 instruction lengths, although the amount of instruction depends on the method of forming a central processor unit (CPU) and an instruction length. As shown in the example (No. 2) where the target side instruction is not fetched upon a start of the branch target instruction shown in FIG. 4 and where two instructions comprising branch target instruction (T) and (T)+1 are fetched, instruction (T)+2 of the target side is not fetched at timings (5) and (6). Therefore, instruction (T)+1 cannot be executed in timing (7) and the central processor unit (CPU) falls into a state of waiting for an instruction to be executed to be fetched.

In order to solve the problem, as shown in FIG. 4, for example, it is necessary to determine the fetch address, at least upon the timing (4) when an instruction (T)+2 of a target side is fetched in timing (6). The determination of the fetch address uses a result of an address calculation at an A state of branch instruction (B). Thus, it is not necessary to wait for an E cycle to determine whether the branch condition is successful or not. However, when the target side instruction fetch is driven, it is necessary thereafter to add an extra hardware to switch the process to an instruction fetch of a part following the branch instruction.

Namely, when the branch target instruction address is maintained and the instruction fetch following the branch target instruction is conducted, the means for updating this instruction fetch, namely, the means for calculating an address of an instruction following the branch target instruction, is necessitated independently of the address calculating means of the instruction following the branch instruction of the next side.

SUMMARY OF THE INVENTION

An object of the present invention is to provide an instruction fetching control system for effectively prefetching an instruction set following the branch target instruction, where the branch instruction is a non-condition branch instruction or an instruction in which the branch can be predicted.

A condition branch instruction for judging the value of the flag set (or condition code) which is updated in accordance with an execution of the operation instruction, represents the branch instruction.

Where an operation instruction is provided immediately before the condition branch instruction and the flag sets is updated in E state of the operation instruction, the branch judgement cannot be carried out at least until the E state of the branch instruction is executed. This is because the updating of the flag sets in the operation instruction is usually executed after an operation cycle.

However, where an operation instruction is not executed immediately before it, the judgement can be carried out without waiting for the original judgement cycle (i.e. E cycle) of the branch instruction.

On the other hand, some branch instructions are branched without any conditions and the resulting non-condition branches are determined based on an instruction code of the branch instruction. For example, in commercially available systems, BAL (branch and link) instructions and BAS (branch and safe) instructions are non-condition instructions and they can be judged based on the instruction code. The BC (branch condition) instruction is a condition branch instruction, but where bits 8 to 11 of the instruction code are X'F' (hexa decimal number) and bits 12 to 15 are not X'O', the process performs non-condition branch. Where bits 8 to 11 or bits 12 to 15 are X'O', the process is not branched.

In this case, the process is branched without any condition, whether or not the branch condition is successful or unsuccessful. Thus, a control can be effectively moved to fetch an instruction set following the branch instruction.

This is conducted to drive a head address in which instruction ① of buffer memory 15 is stored.

The present invention provides an instruction fetching control system for executing and prefetching an instruction and for prefetching the branch target instruction of the branch instruction prior to the branch judgement cycle. The system comprises means for performing a prior branch judgement based on an instruction code within the branch instruction prior to the branch judgement cycle of the pipeline when the above instruction is executed, means for detecting whether the condition judgement can be carried out in the preceding cycle and for performing the branch judgement, and means for starting a prefetch of instruction sets following the above branch target instruction without waiting for the branch judgement cycle in the pipeline of the branch instruction when the branch judgement means determines that the branch is successful.

When the branch instruction is executed, it is judged whether the branch judgement can be carried out in the cycle preceding the branch condition judgement cycle of the pipeline. This is done in order to perform an instruction prefetching when the branch instruction is executed, thereby performing the branch judgement. If the branch is successful, the instruction of a part following the branch target instruction upon the next cycle of the decode start of the branch target instruction is fetched to the instruction register and the instruction decode is carried out in a pipeline manner. Thus, the central processor unit (CPU) is prevented from falling into a state in which it must wait for an instruciton fetch.

BRIEF DESCRIPTION OF THE DRAWING

FIG. 12 is a truth-value table of the branch condition selection circuit, and FIG. 13 is view for explaining a branch prediction cycle.

DESCRIPTION OF THE PREFERRED EMBODIMENT

Figure 5:
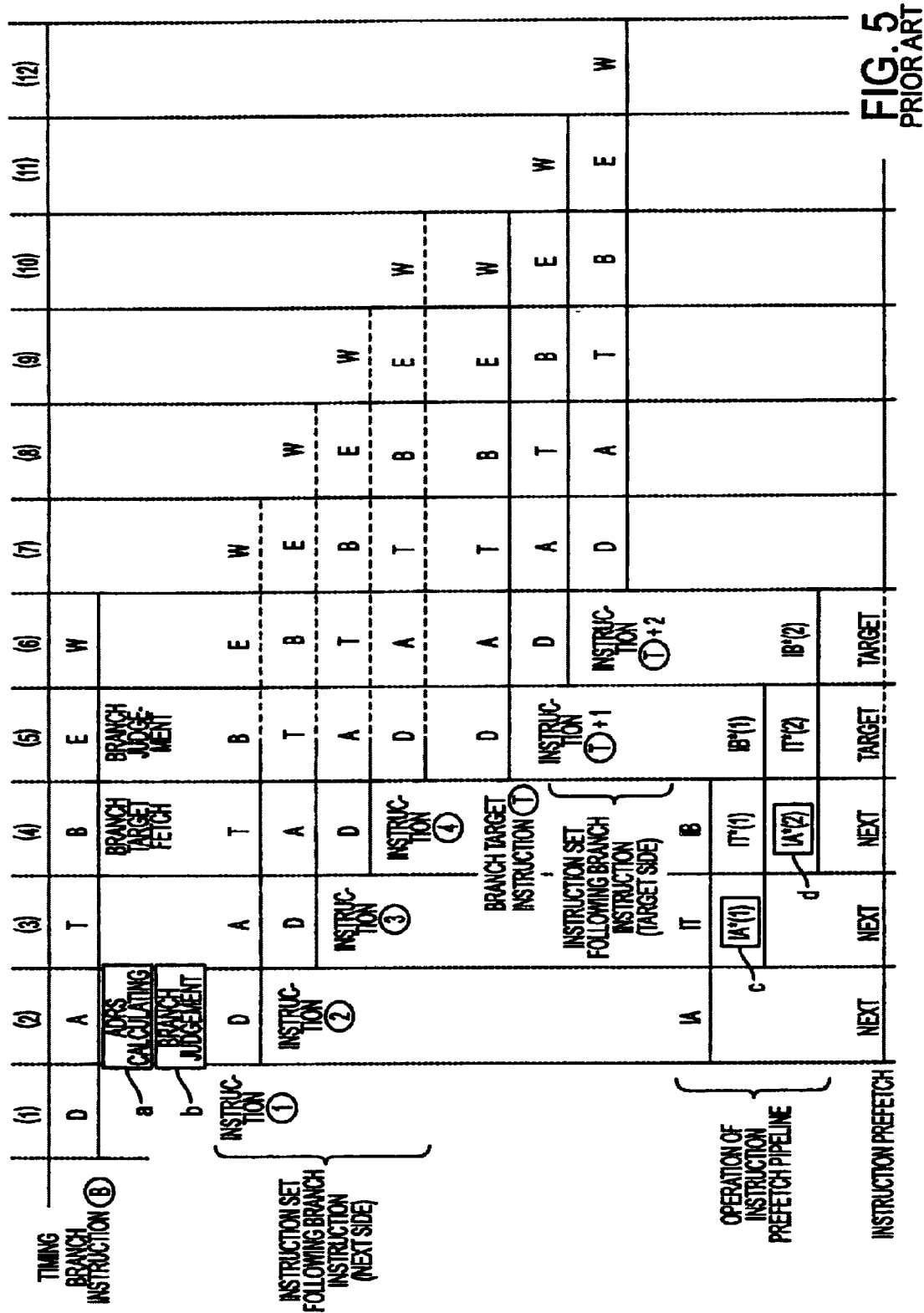
FIG. 5 is a view for explaining an execution of the non-condition branch instruction in a one cycle pipeline.

FIG. 5 shows a view for explaining an execution of the non-condition branch instruction in one pipeline cycle according to the present invention. In this example, branch target instructions Ⓣ Ⓣ+1, Ⓣ+2 are fetched for every instruction.

In FIG. 5, a stage of timing (2), an address calculation (shown by symbol a in FIG. 5) of branch target instruction Ⓣ is carried out in A state of branch instruction Ⓑ. Then a branch judgement (shown by a symbol b in FIG. 5) is made based on the instruction code of branch instruction Ⓑ, as to whether or not the branch is a non-condition branch or whether or not the branch is predictable. When the branch is judged to be successful, an address calculation in process state IA*(1) in an instruction prefetch pipeline in a stage of timing (3) is performed for branch target instruction Ⓣ+1, as shown by symbol c in FIG. 5, and an address calculation is performed in a process state IA*(2) in a stage of timing (4) for branch target instruction Ⓣ+2(shown by symbol d in FIG. 5).

In timing stage (5), a fetch of first instruction (T)+1 of the target side can be conducted. Thus, instruction (T)+1 following head instruction (T) of the branch target, and also instruction (T)+2 following the instruction (T)+1 of the branch target, can be carried out smoothly.

Figure 6:
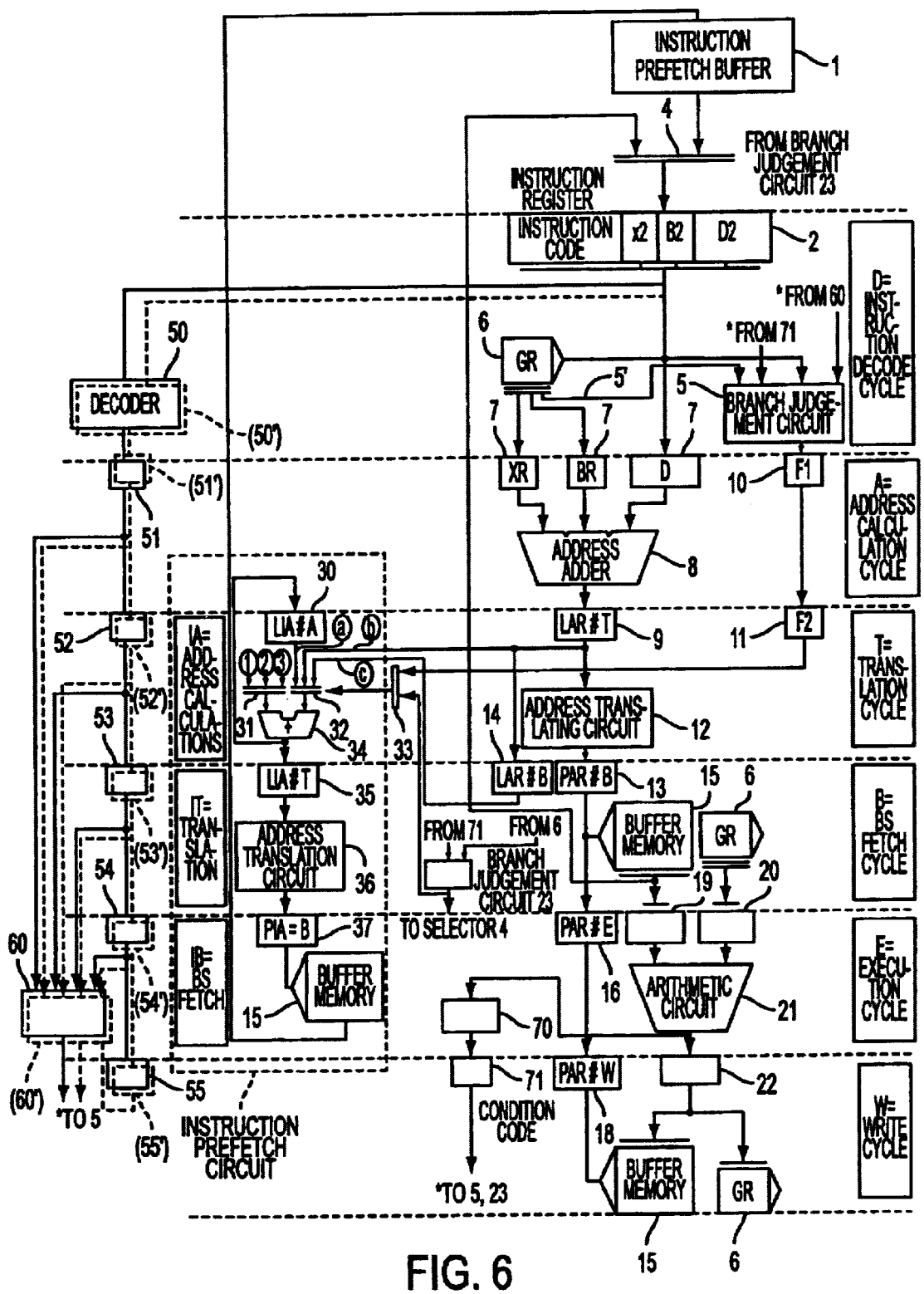
FIG. 6 is a block diagram representing an embodiment of the present invention.
Figure 7:
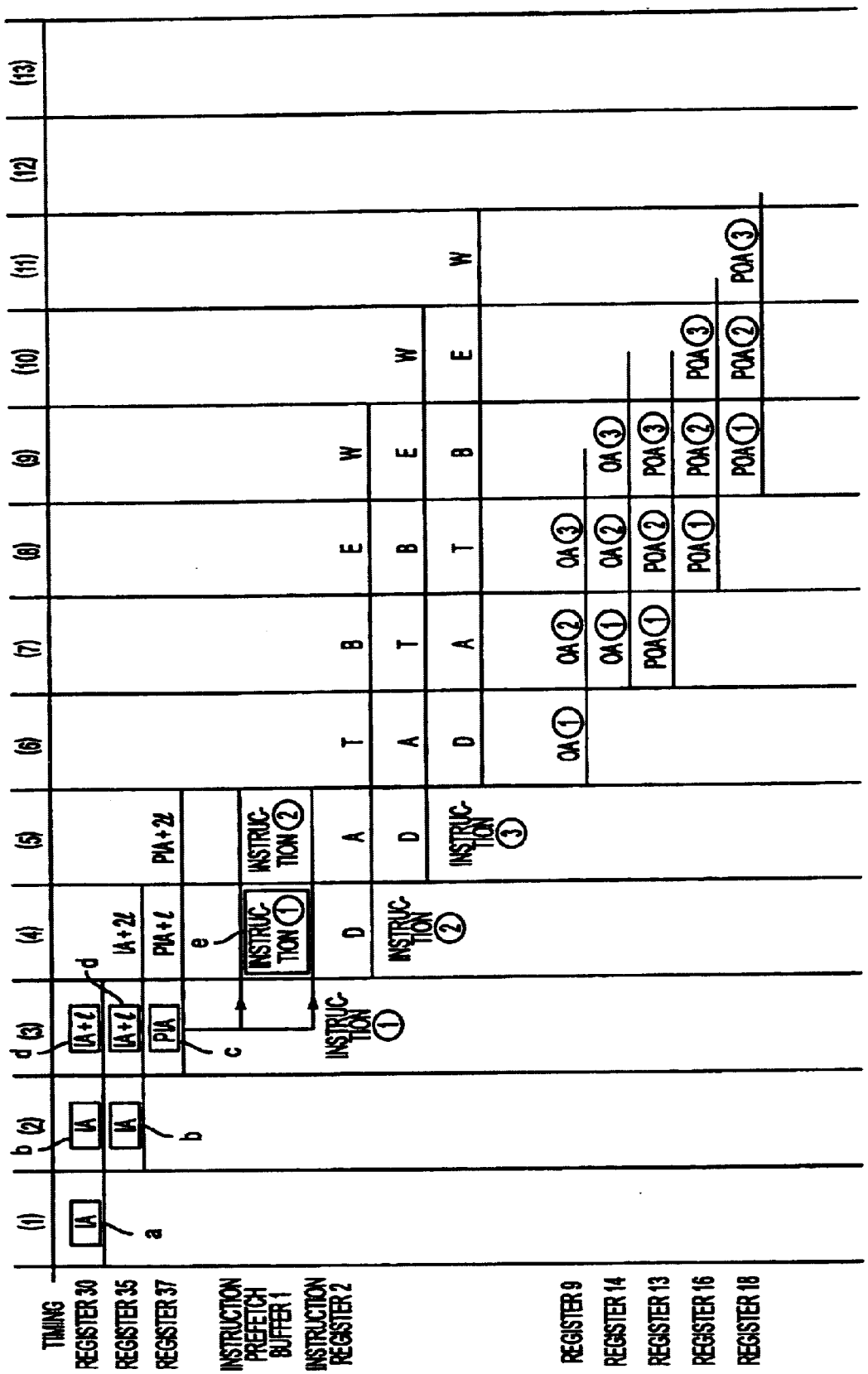
FIG. 7 is a view for explaining the case where a general instruction is executed in the embodiment of the present invention.
Figure 8:
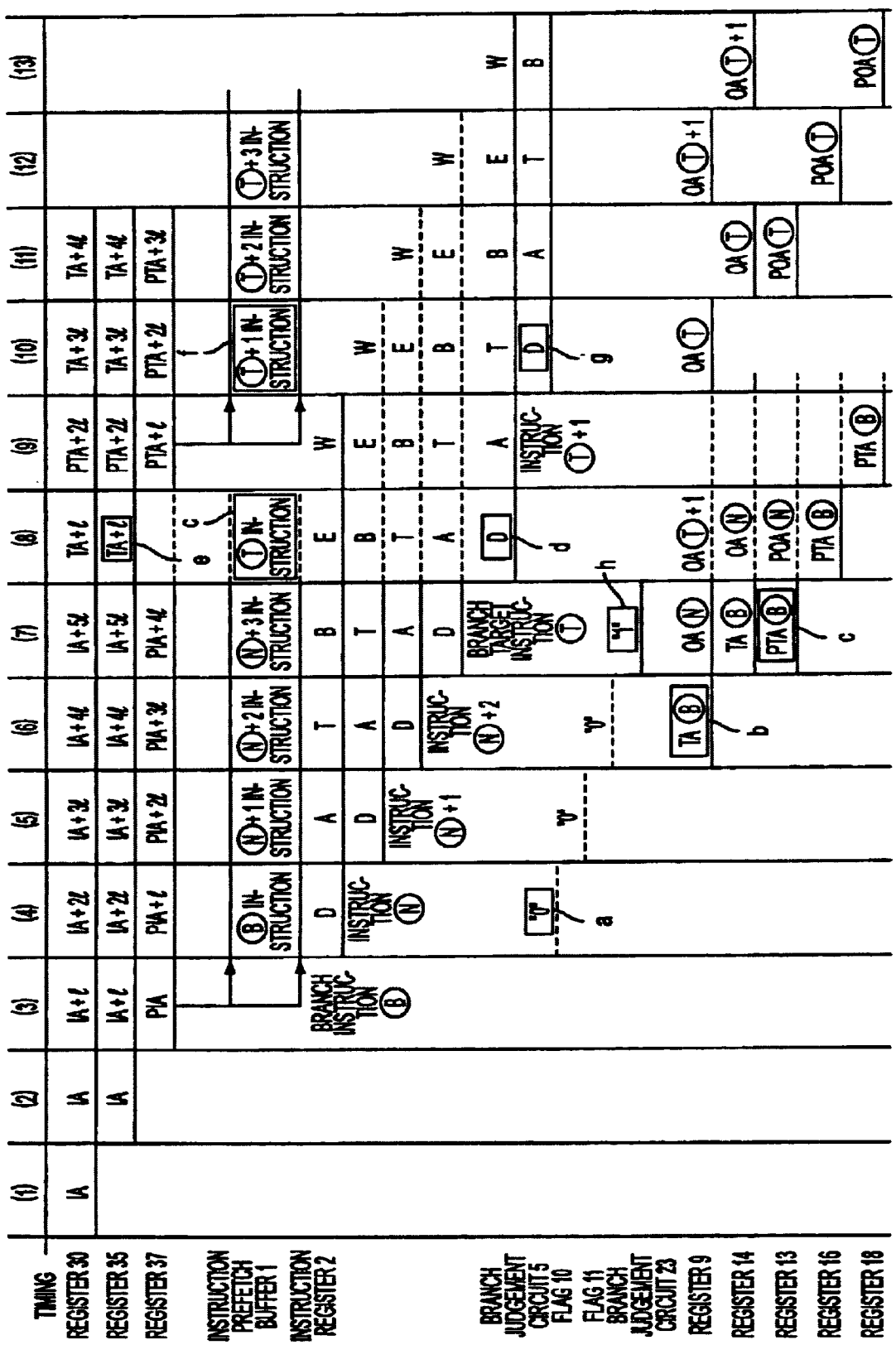
FIG. 8 is a view for explaining the case where the condition branch instruction is executed in the embodiment of the present invention.
Figure 9:
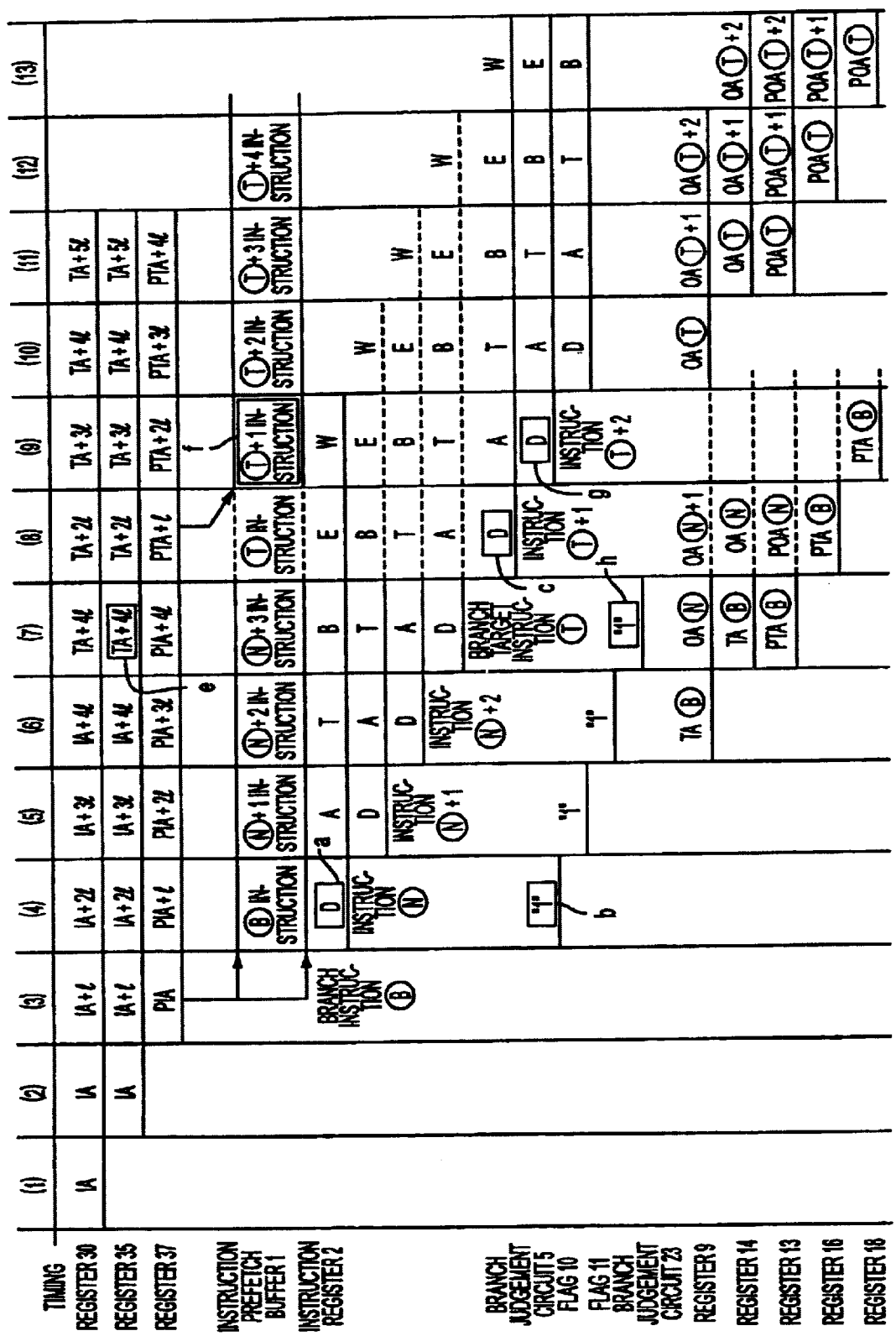
FIG. 9 is a view for explaining the case where the non-condition branch instruction is executed in the embodiment of the present invention.

FIG. 6 shows an embodiment of the present invention. FIG. 7 shows a view for explaining an execution of a general instruction in the embodiment shown in FIG. 6. FIG. 8 is a view for explaining the execution of a branch instruction when the branch cannot be predicted. FIG. 9 is a view for explaining the execution of a branch instruction when the branch prediction can be performed.

1 of the embodiment shown in FIG. 6 is an instruction prefetch buffer used for instruction fetch, 2 is an instruction register, 4 is a selector for switching an ordinary instruction and branch target instruction using branch judgement circuit 23, 5 is a branch judgement circuit for an instruction code according to the present invention, 6 is a general register set (GR), 7 is a register set (XR, BR, D) for calculating an address, 8 is an address adder, 9 is a register (LAR#T) for receiving the result of an address adder, 10 and 11 are flags (F1 and F2) for maintaining the result of branch judgement circuit 5 to be matched with a progress of a pipeline, 12 is an address translating circuit for performing an address translation based on the value of register (LAR#T) 9, 13 is a register for maintaining a result of an address translation circuit, 14 is the register (LAR#B) for maintaining the value of register (LAR#T) 9 without being translated and shifting it by one timing, 15 is a buffer memory, 16 is a register (PAR#E) for maintaining the value of register (PAR#B) 13 to be matched with a progress of a pipeline and to be shifted by one timing, 18 is a register (PAR#W) for maintaining the value of register (PAR#E) 16 to be matched with a progress of a pipeline by being shifted by one timing, 19 is a register for receiving an operand of an arithmetic operation from buffer memory 15, 20 is a register for receiving an operand of an arithmetic operation from general register set 6, 21 is an arithmetic logical unit circuit, 22 is a register for maintaining an operation result, 23 is a conventional branch judgement circuit, 30 is a register (LIA #A) for maintaining an instruction prefetch address, and 31 is a selector for selecting an instruction length of the instruction which is prefetched. The input signals ①, ② and ③ to the selector are explained below.

Signal ① represents an amount of fetch of an ordinary instruction prefetch. Signal ② represents an instruction length of the branch target instruction to be fetched in instruction prefetch buffer 1 from buffer 15 by a branch instruction for determining the branch in branch judgement circuit 5. Signal ③ represents an instruction length of a branch target instruction to be fetched to the instruction prefetch buffer 1 from buffer 15 by the branch instruction for determining the branch in branch judgement circuit 23.

32 represents a selector of an instruction fetch address, which operates in the same manner as selector 31. With regard to signals ①, ② and ③ of selector 31, signal (a) selects a content of register 30 in accordance with an ordinary instruction prefetch, signal (b) selects a content of register 9 where the branch is determined by branch judgement circuit 5, and signal (c) selects a content of register 14 where the branch is determined by branch judgement circuit 23, respectively.

33 is a circuit for forming a selection control signal based on the result of branch judgement circuit 5 or branch judgement circuit 23. Branch judgement circuit 23 is controlled with a priority whereby the result of branch judgement circuit 5 and branch judgement circuit 23 simultaneously show the branch.

34 is an address adder, 35 is a register (LIA #T) for receiving a result of an address adder, 36 is an address translation circuit, 37 is a register (PIA=B) for receiving the result of an address translation.

50 is a decoder circuit for determining in D cycle that the instruction sets a condition code, 51 is a flag for maintaining an output of decoder circuit 50, 52 is a flag for maintaining the output from flag 51, 53 is a flag for maintaining an output from flag 52, 54 is a flag for maintaining the output of flag 53, 60 is a timing judgement circuit for detecting a timing of a production of the condition code and a branch judgement using the condition code, 70 is a condition code generating circuit and 71 is a condition code flag.

For convenience of explanation, three general registers 6 and three buffer memories 15 are shown in FIG. 6, but the general registers 6 are the same device and the buffer memories are the same device.

A state of an instruction execution in the present invention is explained as being divided into a case of a general instruction, a case of the branch instruction where the branch prediction is impossible and a case of an execution of the branch instruction where the branch instruction can be predicted, in accordance with three separate sections.

Further, examples of the branch prediction will be explained following the above explanations.

(1) The case of executing a general instruction.

Figure 1:
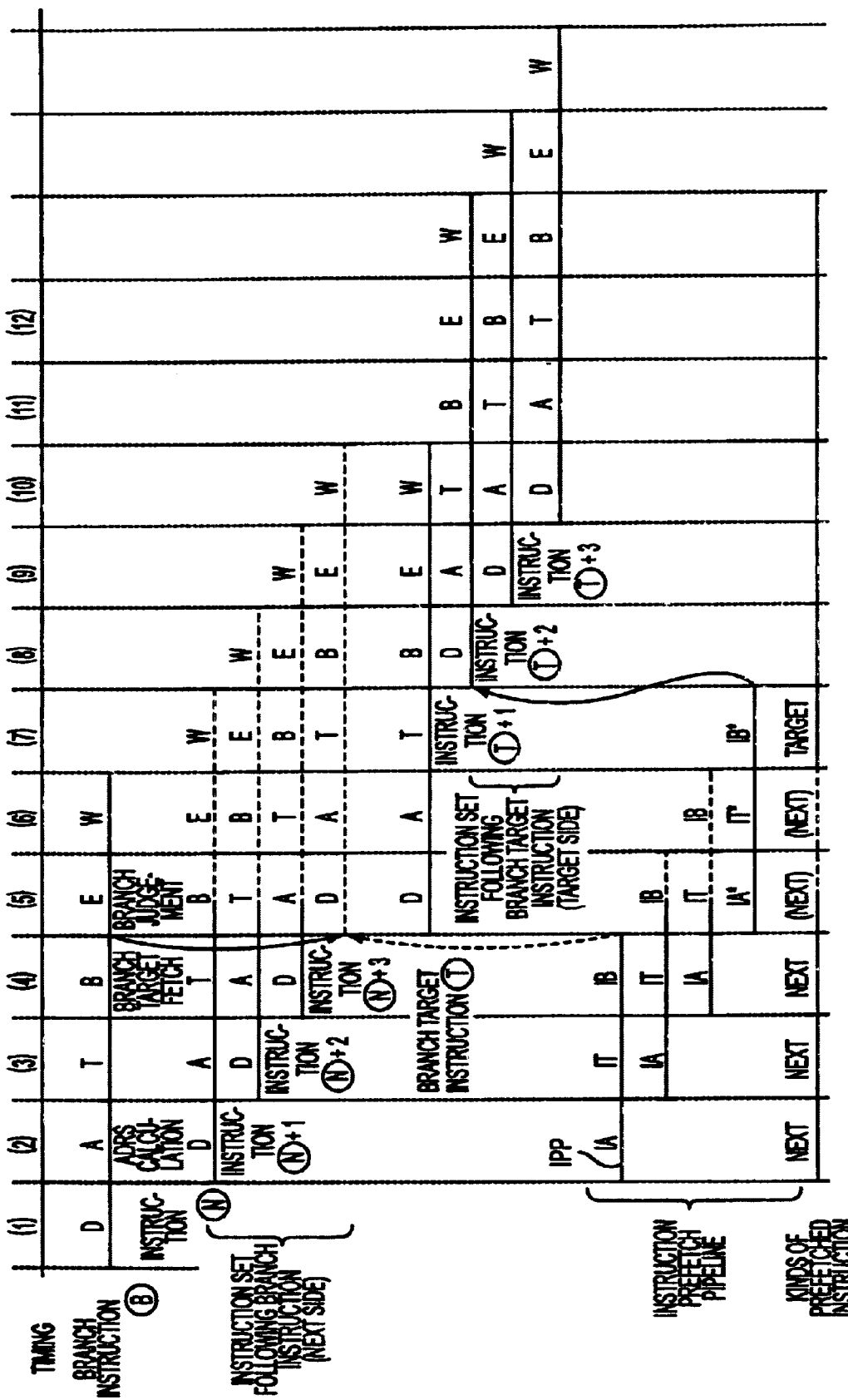
FIG. 1 shows a view for explaining an execution of a branch instruction in a one cycle pipeline.
Figure 2:
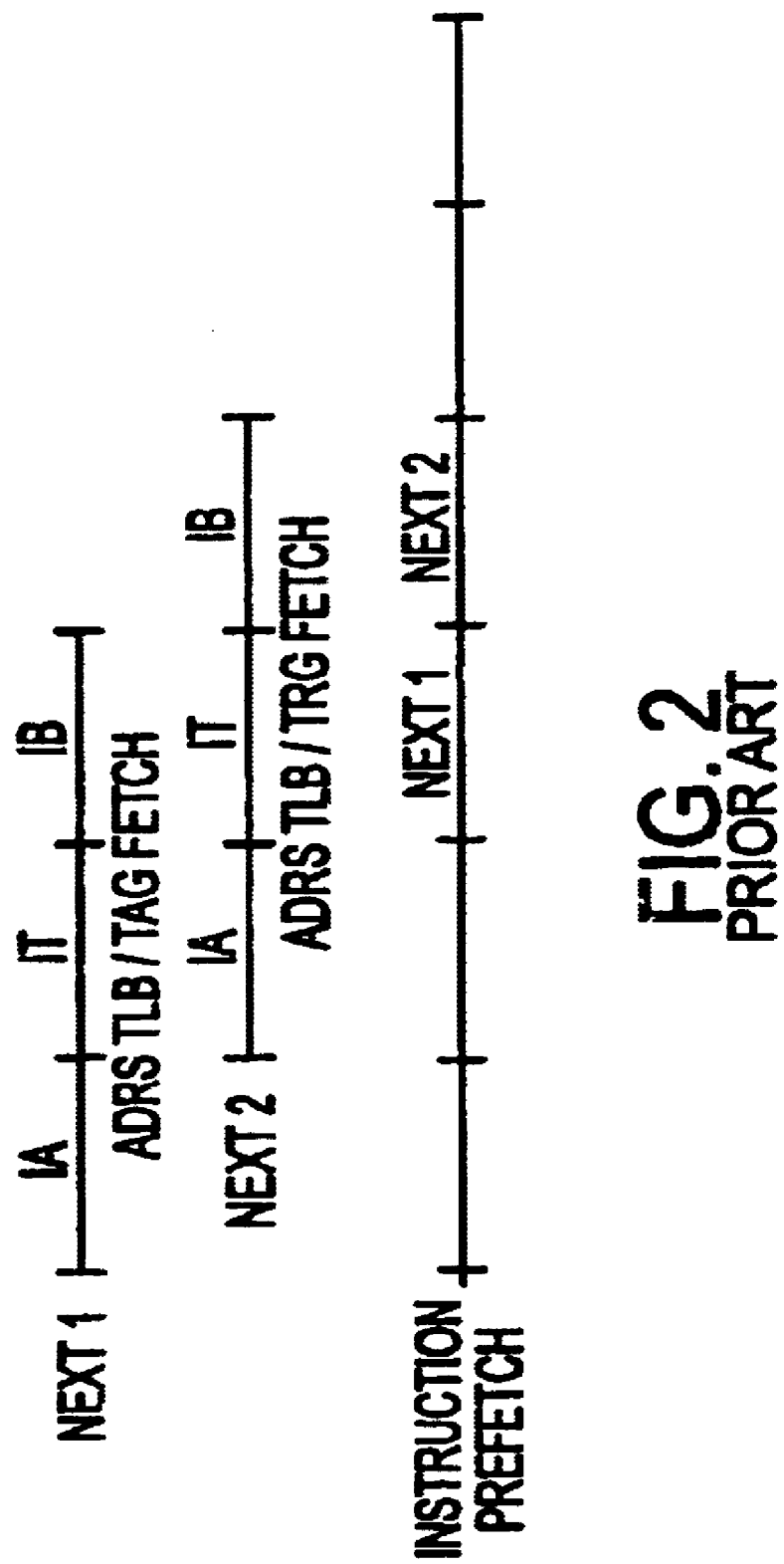
FIG. 2 shows a view for explaining an instruction prefetch pipeline.
Figure 3:
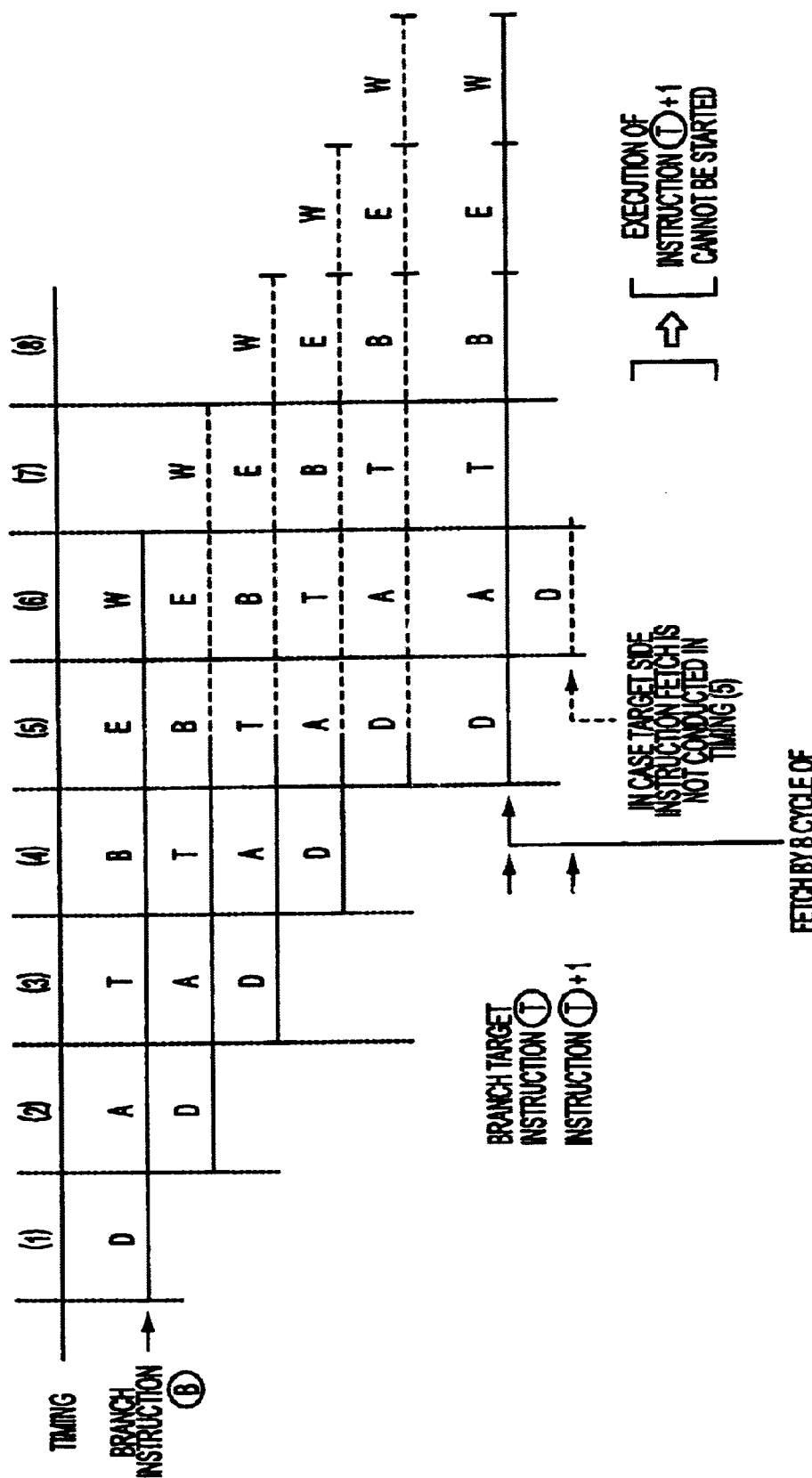
FIG. 3 is a view representing an example (No. 1) where an instruction fetch on a target side is not carried out when a branch target instruction starts.
Figure 4:
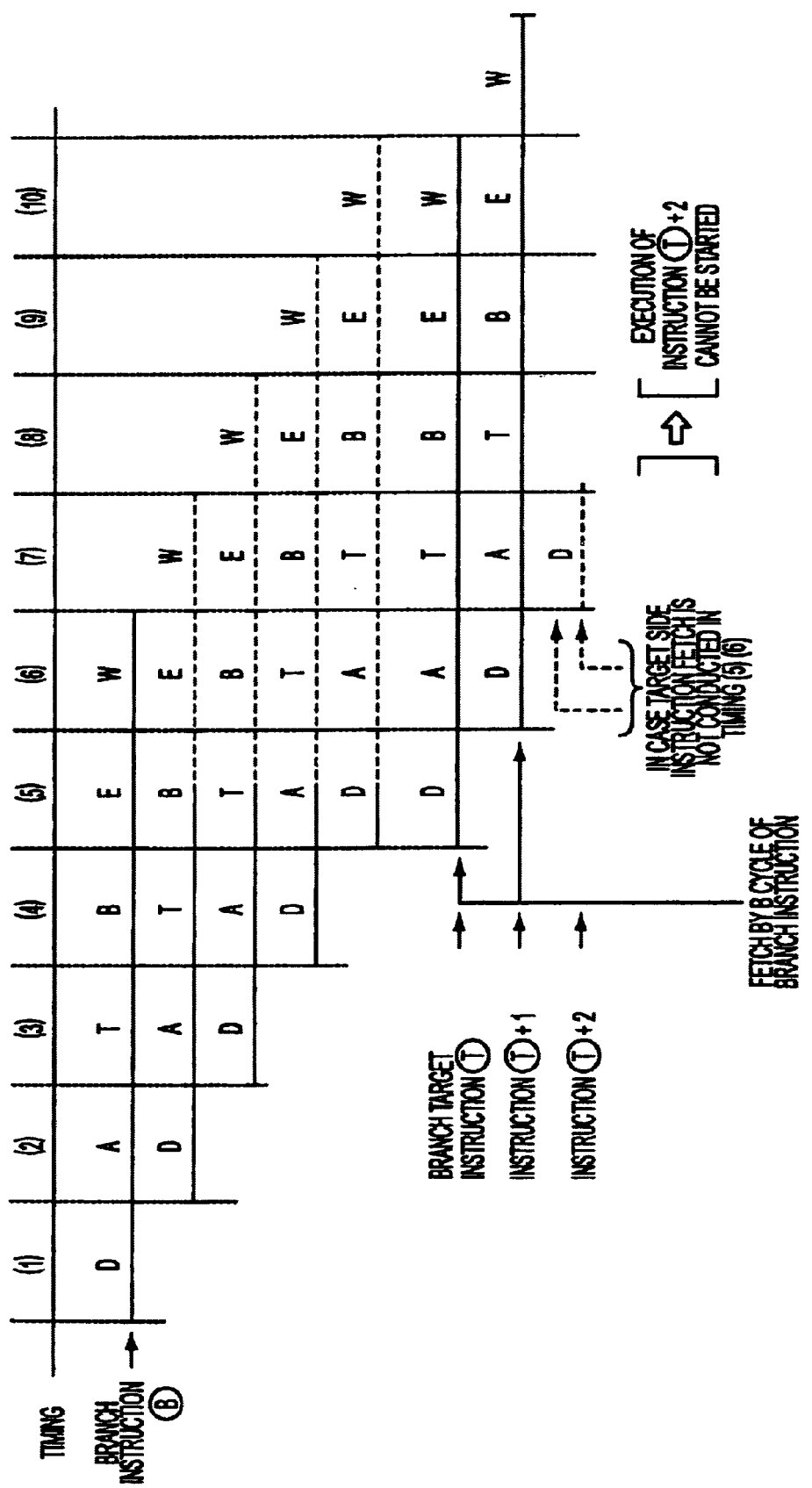
FIG. 4 is a view for explaining an example (No.2) where the instruction fetch on the target side does not occur when the branch target instruction starts.

FIG. 7 shows a view for explaining the case where a general instruction is carried out in the embodiment of the present invention shown in FIG. 2. By referring to FIG. 7, execution of a general instruction, namely, execution of an instruction which is not the branch instruction, will be explained.

In this computer's initial state, an address of first executed instruction ① is set in register (LIA #A) 30 for maintaining the instruction prefetch address. This address value is "IA" designated by symbol a in FIG. 7. The signal ① representing a fetch amount of the instruction prefetch which is input to selector 31 is "0" and corresponds to an address of the head region of buffer memory 15 in which instruction ① is stored. At this time, both branch judgement circuits 5 and 23 show a non-branch condition.

In timing (1), the value "0" of signal ① selected by selector 31 is added by added 34 to the value "IA" in register (LIA #A) 30 and is set to register (LIA#T) 35 and register (LIA #A) 30, as indicated by symbol b in FIG. 7. Namely, this is conducted to fetch a head address of buffer memory 15 in which instruction ① is stored.

In timing (2), an address (IA) stored in register (LIA #T) 35 is translated to a real address by address translation circuit 36 and the result is set in a register (PIA #B, shown by symbol "PIA" in FIG. 7), which is shown by symbol "c" in FIG. 7.

Simultaneously the amount (or length) of instruction fetched by this address appears in signal ① (the value designated by a symbol "e") and a calculation of the next instruction fetch address is carried out in adder 34. The result (the value shown by "IA+l" in FIG. 7) is set in register (LIA#T) 35 and register (LIA #A) 30, shown by symbol "d" in FIG. 7. This operation is carried out to fetch an address of a region of the buffer memory 15 in which instruction ② is stored.

Access to the addresses IA, IA+l, and IA+2l in which instructions ①, ② and ③ are stored is shown below. Until instruction fetch buffer 1 is filled by a prefetch instruction train, operation of this instruction fetch starts at every cycle (or with an interval). The values stored in register (LIA #A) 30 and register (LIA #T) 35 are incremented from IA to IA+2l, to IA+3l . . . to IA+nl. The value stored in register (PIA#B) 37 is incremented in this same manner, from PIA+1l to PIA+2l . . . to PIA+nl. Therefore, by sequentially, in every l address, reading an instruction from an address of buffer 15 in which instruction ① is stored, a pipeline operation is executed.

Next, in timing (3), buffer memory 15 is accessed by the value "PIA" of register (PIA#B) 37 and the result (instruction ① in FIG. 7) is set in instruction prefetch buffer 1 as shown by symbol "e" in FIG. 7. At this time, if instruction prefetch buffer 1 is empty, because of an initial state, or if the instruction prefetch buffer 1 is not empty, the instruction is stored in instruction prefetch buffer 1 in the order of the instructions in sequence, and when the next cycle starts, the instruction is set in instruction register 2.

In timing (4), decoding of instruction ① within instruction register 2 starts (D state). Namely, in accordance with the value of instruction register 2, general register set (GR)6 is accessed and the value of the register necessary for an address calculation is set in register set (XR, BR, D)7.

In this embodiment, the value of the general register of the register number designated by the X2 portion and the P2 portion in the instruction code is read into registers (XR and BR) within a register set (XR, BR, D)7 and the D2 portion in the instruction code is set in register (D) in the register set (XR, BR, D)7 without suffering any change. Generally, the address in instruction register 2 is a logic address. As a preprocess of translating the logical address to a real address, the base address is obtained from general register 6 by X2 and B2 of the address portion and the displacement D2 of the address portion is added to them by address adder 8.

When decoding of an instruction is completed, the next instruction (instruction ② in FIG. 7) is set in instruction register 2 from instruction prefetch buffer 1.

If the instruction which has started is a branch instruction, a branch judgement is performed by branch judgement circuit 5 based on the instruction code or the immediately prior state of the pipeline, and the result is set in flag (F1) 10. If the instruction is not the branch instruction, the output of branch judgement circuit 5 is "0" as set by flag (F1) 10. (Execution of the branch instruction will be explained later.)

In the next timing (5), operand address calculation is carried out (A state) in accordance with the value of register set (XR, BR, D) 7. Namely, the value of register (XR,BR,D) is added by address adder 8 and the addition result (the value shown by symbol "OA ①" in FIG. 7) is set in register (LIR #T)9. The content of flag (F1) 10 is then moved to flag (F2) 11 and in timing (5) the decode of the next instruction ② starts (D state).

In the next timing (6), the value (OA ①) of register (LA#T)9 is translated by address translating circuit 12, and the result (the value shown by symbol "POA ①" in FIG. 7) is set in register (PAR#B) 13 (T state). The value of register (LAR#T)9 is also set in register 14 (LAR#B). In the next timing (7), buffer memory 15 is accessed, in accordance with the value of register (PAR#D) 13 (B state). The fetch data is set in register 19. General register set 6 is accessed simultaneously by a signal (not shown) obtained by keeping the content of part of the address portion of instruction register 2 until the B cycle is begun and the result is set in register 20. The value (POA ①) in register (PAR#B), are set in the (PAR#E) 16.

The next timing (8) is the operation cycle (E state) and the result obtained by arithmetic operation circuit 21's calculation of the values of registers 19 and 20 is set in register 22. Namely, the data of buffer memory 15 is, for example, added to the data of general register set 6. The value of register (PAR#E) 16 is set in register (PAR#W) 18.

In the next timing (9), a storing cycle (W state) operates to store the value of register 22 in buffer memory 15 and general register set 6. At this time, the value (POA ①) of register (PAR#W) 18 is used for accessing the buffer memory.

Instruction ② is executed in accordance with a similar sequence.

The general instruction is executed as recited above. It is a matter of course that the access to the buffer memory and the access to the general register set cannot be conducted depending on a definiton of the instruction.

(2) The case of executing a branch instruction where the branch cannot be predicted.

Execution of a condition branch instruction (also referred to as a "branch instruction") will first be explained by referring to FIG. 8.

In the case of the branch instruction, the instruction fetch can be conducted in the same manner as in the general instruction case, as explained in FIG. 7, and the decode (D state) of branch instruction Ⓑ starts in timing (4) in FIG. 8.

In this case, branch judgement circuit 5 performs a branch judgement based on an instruction code and an immediately prior pipeline state, and "0" (which designates that the branch prediction is impossible), is outputted (as shown by symbol "a" in FIG. 8). Address calculation and address translation by general register set (XR, BR, D) 7, address adder 8 and address translation circuit 12 are conducted in the same sequence as shown in FIG. 7. Namely, in timing (6) the value of register (LAR#T) 9 (shown by a symbol "b" and "TA Ⓑ") is subjected to an address translation and the result (PTA Ⓑ) is set in register (LAR#B) 13 (shown by symbol "c" in FIG. 7).

In the next timing (7), namely in B state, the fetch data from buffer memory 15 serves as an instruction for the branch target and is set in instruction register 2. Branch judgement circuit 23 carries out a branch judgement of branch instruction Ⓑ in the B state (timing 7).

If the judgement result is non-branch, then selectors 31 and 32, instruction registers 2 and selector 4 in an instruction prefetch circuit, selects an ordinary process using the same sequence as in the case of a general instruction other than the branch instruction.

On the other hand, when the branch is successful, selector 4 selects a branch target instruction which is set in instruction register 2 to start an execution of branch target instruction Ⓣ, as shown by symbol "d" in FIG. 8. Where the branch is successful as a result of the branch judgement of this timing, selector 4 selects a fetch data from buffer memory 15 to be set in instruction register 2. Where a branch is not successful, selector 4 selects an instruction from instruction prefetch buffer 1 to be set in instruction register 2.

Execution of the instructions Ⓝ, Ⓝ+1, Ⓝ+2, and Ⓝ+3 which start following branch instruction Ⓑ is interrupted and similarly, the instruction prefetch sequence which is being executed is also interrupted (as shown by portion expressed as a pipeline process sequence and as shown by a broken line in FIG. 8).

When an output "1" of branch judgement circuit 23 (shown by the portion designated by symbol "h" in FIG. 8), selector 31 selects signal ③ and selector 32 selects signal ⓒ, namely, register (LAR#B) 14. Signal ③ shows the length of branch target instruction Ⓣ fetched in timing (7) and therefore an address of instruction (Ⓣ+1) following the branch target instruction is outputted at the output of adder 34.

The address is set in register (LIA#T) 35 in address "TA+1" designated by symbol "e" in FIG. 8. The instruction fetch, in accordance with this address, is conducted in timing (9) (shown by a portion designated by symbol "f" in FIG. 8). The decoding of instruction ((Ⓣ)+1) starts in timing (10) (as shown by a portion designated by symbol "g" in FIG. 8). Namely, one cycle in which an instruction cannot start is caused between timing (8) of decode start cycle of branch target instruction Ⓣ, and timing (10) of the decode start cycle of the following instruction ((Ⓣ)+1), thereby preventing a pipeline operation.

In the case of executing a branch instruction where the branch cannot be predicted, the operation of the present embodiment is the same as that of the prior art. If this is intended to be improved, the selection of an instruction between the branch side and the ordinary side is required to be changed so that it does not occur before address adder 34, but immediately before address translation circuit 36 or immediately before an access to buffer memory 15. However, in order to achieve this change, a pair of address adders or a pair of address translation cicuits are necessary, thus requiring a great increase in the amount of hardware. This would result in an uneconomical device.

(3) Execution of a branch instruction where the branch is predicted.

The case of an execution of a branch instruction where the branch can be predicted will be explained by referring to FIG. 9. In FIG. 9, as in FIG. 7, an instruction fetch of branch instruction Ⓑ is carried out and the branch instruction is decoded in timing (4) (as shown by the portion designated as symbol "a").

In this instance, branch judging circuit 5 performs a branch judgement based on an instruction code or an immediately prior pipeline state and when the branch is predicted to be successful, "1" is outputted, otherwise "0" is outputted (as shown by the portion designated by symbol "b" in FIG. 9). Therefore, as in the case of the condition branch instruction in FIG. 8, an address calculation (A state), an address translation (T state) and a branch target instruction fetch (B state) are carried out in respective timings (5), (6) and (7).

In timing (8), namely in E state, selector 4 selects a branch target instruction by an output (shown by the portion designated by symbol "h" in FIG. 8) of branch judgement circuit 23. Therefore, the decode of branch target instruction Ⓣ starts (shown by the portion designated by symbol "c" in FIG. 8).

A branch judgement is conducted in D cycle of branch instruction Ⓑ. Branch judgement circuit 5 outputs "1" when branch instruction Ⓑ is in D cycle. And then, the output is transmitted through flags 10 and 11, and in timing (6) selector 31 selects signal ② and selector 32 selects signal ⓑ, namely reigster (LAR#P) 9. Signal ② is a signal designating the length of a branch target instruction which is expected to be fetched in timing (7) (i.e., a value represented by signal "1" in FIG. 9), and signal ② is added to the content of register (LAR#T) 9 (the value designated by symbol "TA Ⓑ" in FIG. 9) in address adder 34. Thus, an address (TA+1) of the instruction following the branch instruction appears in the output of adder 34.

The address is set in register (LIA#T) 35 as shown by address (TA+1) designated by symbol "e" in FIG. 9. The instruction fetch using this address is conducted in timing (8) as shown by the portion designated by symbol "f" in FIG. 9. Then, the decode of instruction (Ⓣ)+1 starts in timing (9) (as shown by a portion designated by symbol "g" in FIG. 9).

Therefore, when executing the branch instruction where the branch can be predicted, useless time is not created between the branch target instruction and the following instruction.

In timing (7), branch judgement circuit 23 transmits a signal for designating the success of the branch to selector circuit 33. If as a result of this judgement, selectors 31 and 32 are switched in the same manners in the condition branch, then the instruction fetch of the instruction following the branch target instruction starts again, and thus, the instruction fetch of the instruction following the branch target instruction must be prevented from again starting. In order to prevent this, if a branch instruction enabling branch judgement circuit 5 to output "1" activates an instruction fetch of a portion following the branch target instruction, it is necessary for selector 33 to prevent an instruction fetch from being further activated by the following branch judgement. However, where the branch is simultaneously successful in branch judgement circuit 23 and branch judgement circuit 5 because of the reasons other than stated above, the condition of branch judgement circuit 23 has priority. This is because the instruction judged by branch judgement circuit 23 is executed prior to an instruction to be judged by branch judgement circuit 5, and in case of a successful branch of the present branch instruction, the following branch instruction cannot be executed.

In FIG. 6, decoder 50 decodes a content of instruction register 2 to detect whether an instruction is for updating the condition code, thereby providing a flag designating whether or not the updating of the condition code exists, so that the flag is sequentially stored in flags 51 to 54. Decoder 50' decodes a content of instruction register 2 to detect whether an instruction is for updating the content of general register 6, thereby providing a flag designating whether or not the updating of general register 6 exists, so that the flag is sequentially stored in flags 51' to 55'.

Figure 10A:
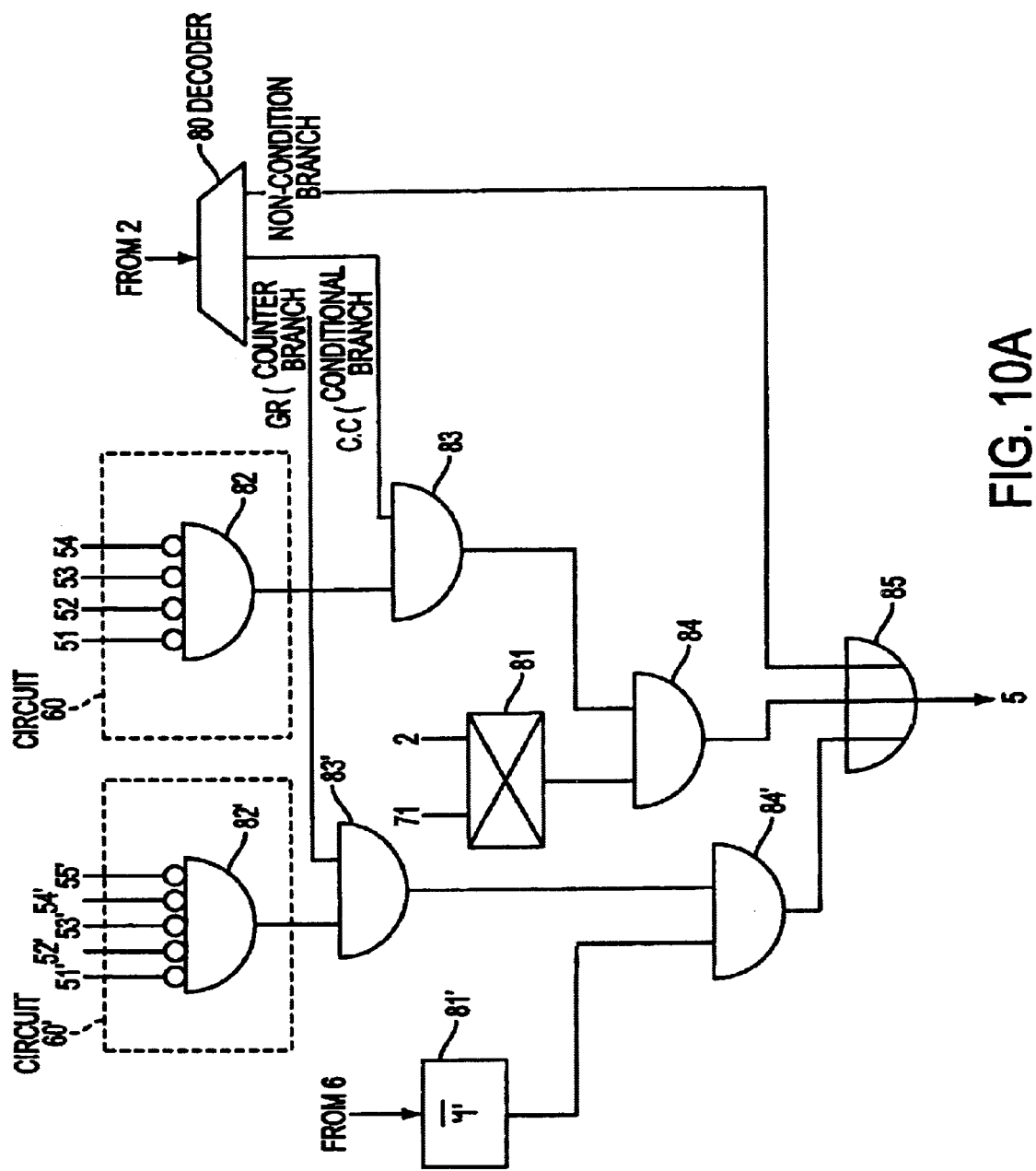
FIGS. 10A, 10B and 10C show concrete circuits of branch judgement circuit 5.

FIG. 10A shows the concrete circuitry of branch judgement circuit 5. The output of decoder instruction register 2 is decoded by decoder 80. Decoder 80 decodes an instruction to detect whether the instruction is for a condition branch or for a non-condition branch. Further, gate 82 determines that a plurality of instructions which are transmitted in a continuous manner from an immediately preceding stage of the branch instruction, do not update the condition code, and gate 82' determines that a plurality of instructions which are transmitted in a continuous manner from an immediately preceding stage of the branch instruction, do not update the content of the general register. The output of AND gate 82 is connected to AND gate 84 through AND gate 83. As a result, in the case of a non-condition branch, or in the case of a predictable instruction even in the case of a condition branch, the output of branch circuit 5 is turned to "1". AND gate 82 in timing judgement circuit 60 determines that all the flags 51, 52, 53 and 54 are in a timing for "0". Namely, AND gate 82 detects that a plurality of, for example, four, continuous instructions immediately preceding the branch instruction do not update the condition code. AND gate 82' of the timing circuit 60' receives the signal from flags 51' to 55', which correspond to respectives timings of A, T, B, E, and W cycles in the pipeline. The output of AND circuit 82' is connected to the input of AND circuit 83'. AND gate 82' of timing circuit 60' determines that all the flags 51', 52', 53', 54' and 55' are in a timing for "0". Namely, AND gate 82' detects that a plurality of, for example, four, continuous instructions immediately preceding the branch instruction do not update the content of the general register for the timings of A, T, B, E and W cycles.

Circuit 83 next judges that the condition branch is successful and the output of the timing judgement circuit 60 is "1". Then judgement circuit 81 determines that a specific relationship between condition code flag 71 and instruction register 2 has been established. In this case, the output of AND circuit 84 becomes "1" and then the instruction is determined as the predictable branch instruction. Alternatively, where decoder 80 determines that the judgement of the branch instruction should be made based on the value stored in general register 6, for example, determines that the instruction is a counter branch instruction, further AND gate 82' determines that a plurality of, for example, four, immediately preceding continuous instructions do not update the content of general register 6 as recited above, and checking circuit 81' detects that the value of general register 6 is not "0000 0001" of the hexa decimal number, namely, that the branch is successful because the value of general register 6 is other than "1". Then the output of AND circuit 84' is turned to "1" and then the instruction is determined as the predictable branch instruction. Therefore, when the non-condition branch is successful or when the output of AND circuits 84 or 84' is "1", OR circuit 85 produces the output "1" and the output of branch judgement circuit 5 is determined as "1". Therefore, it becomes possible for a branch judgement to be conducted prior to an original branch judgement stage.

Judgement circuit 81 performs a branch judgement based on information within the branch instruction (which appears as the output of instruction register 2) and the condition code (which is obtained when the operation result of arithmetic operation circuit 21 is outputted from condition code flag 71 through condition code generation circuit 70), when the output of instruction register 2 and the condition code are in a specific relation and the logic of judgement circuit 81 are usually subjected to an instruction definition by respective CPUs.

Figure 10B:
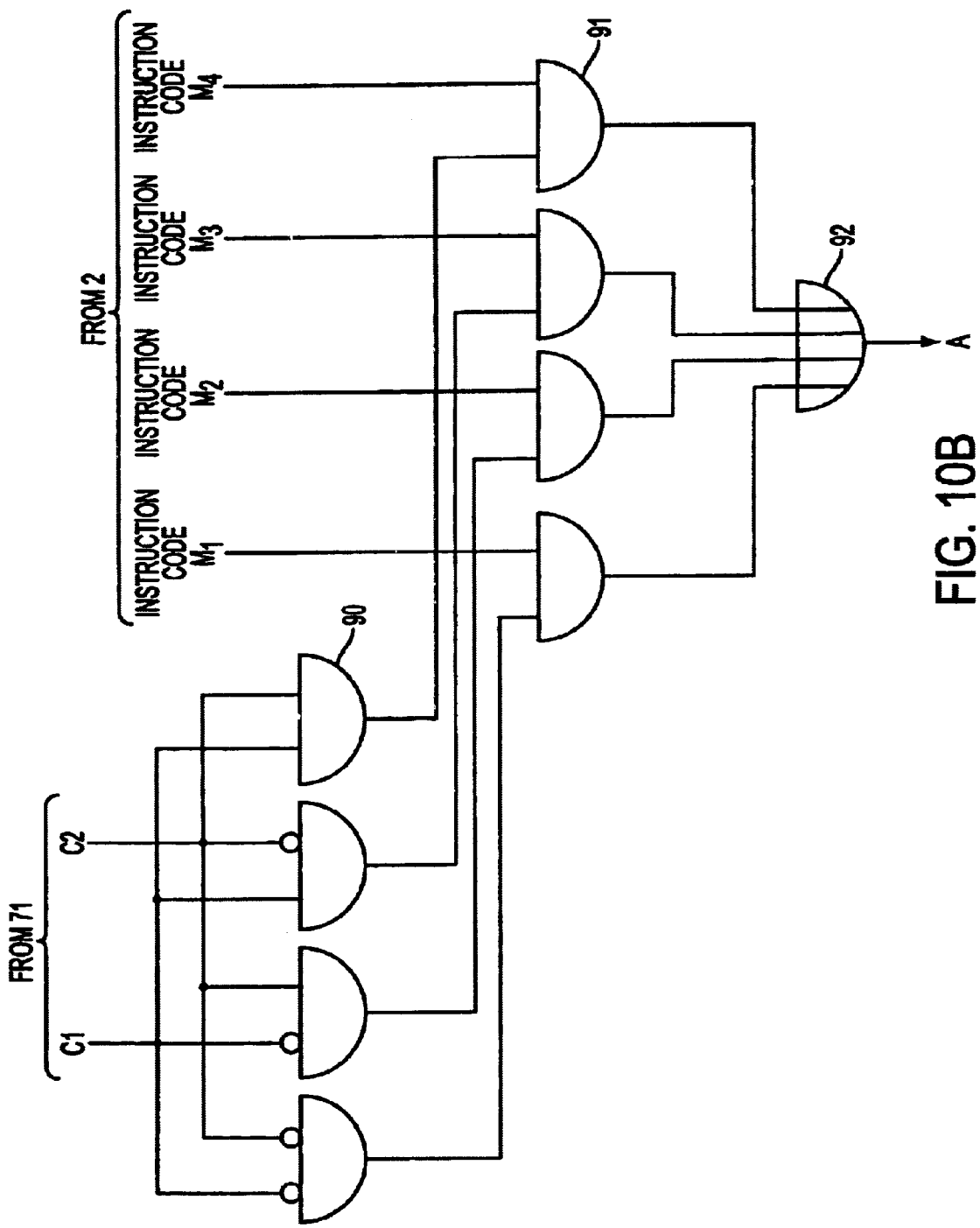

Therefore, judgement circuit 81 outputs a judgement flag (bit) when the branch is successful as a result of a branch instruction, based on the combination of an instruction code, condition code, and data circuit of judgement circuit 81, as shown in FIG. 10B. The condition becomes successful by the combination of 4 bits, M1, M2, M3 and M4, for example, of the mask field of instruction register 2 for the branch instruction and the pattern transmitted from condition codes C1 and C2 from condition code flag 71. For example, when M4 is 1 and both C1 and C2 are (1, 1), the outputs of AND circuits 90 and 91 become "1", thereby producing "1" output A through OR circuit 92. Similarly, when C1=0 and C2=1 and M2=1; or C1=0, C2=0 and M1=1, the output A of OR circuit 92 becomes "1". When the output of timing judgement circuit 60 is 1 simultaneously with the "1" output A, the output of branch judgement circuit 5 becomes "1". Therefore, even in case of the condition branch, the process can be branched to an address designated by the address portion of the condition branch instruction and the branch can therefore be predicted.

Figure 10C:
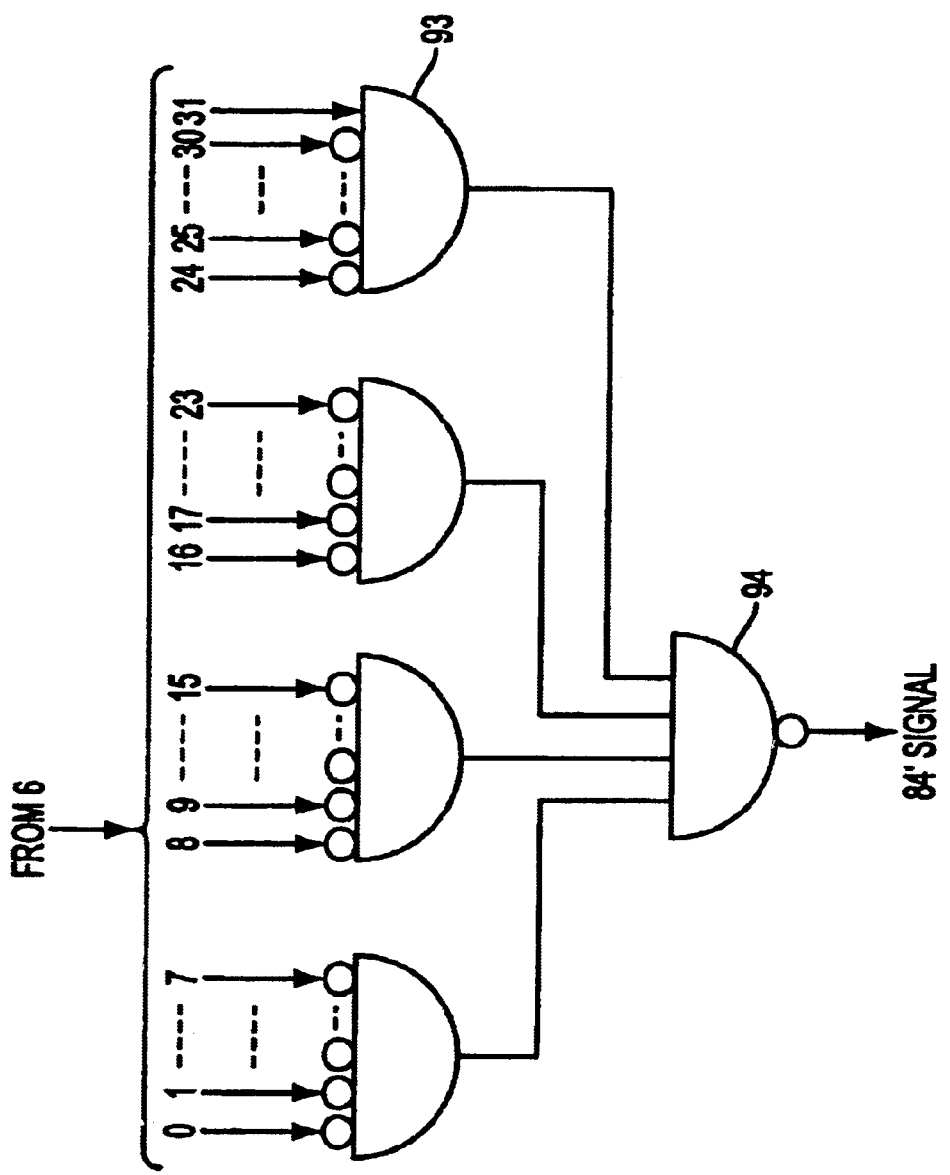

FIG. 10C shows a detail circuit of judgement circuit 81' which is used when the decoder 80 determines that the instruction is the counter branch instruction and which will be explained later.

Figure 11:
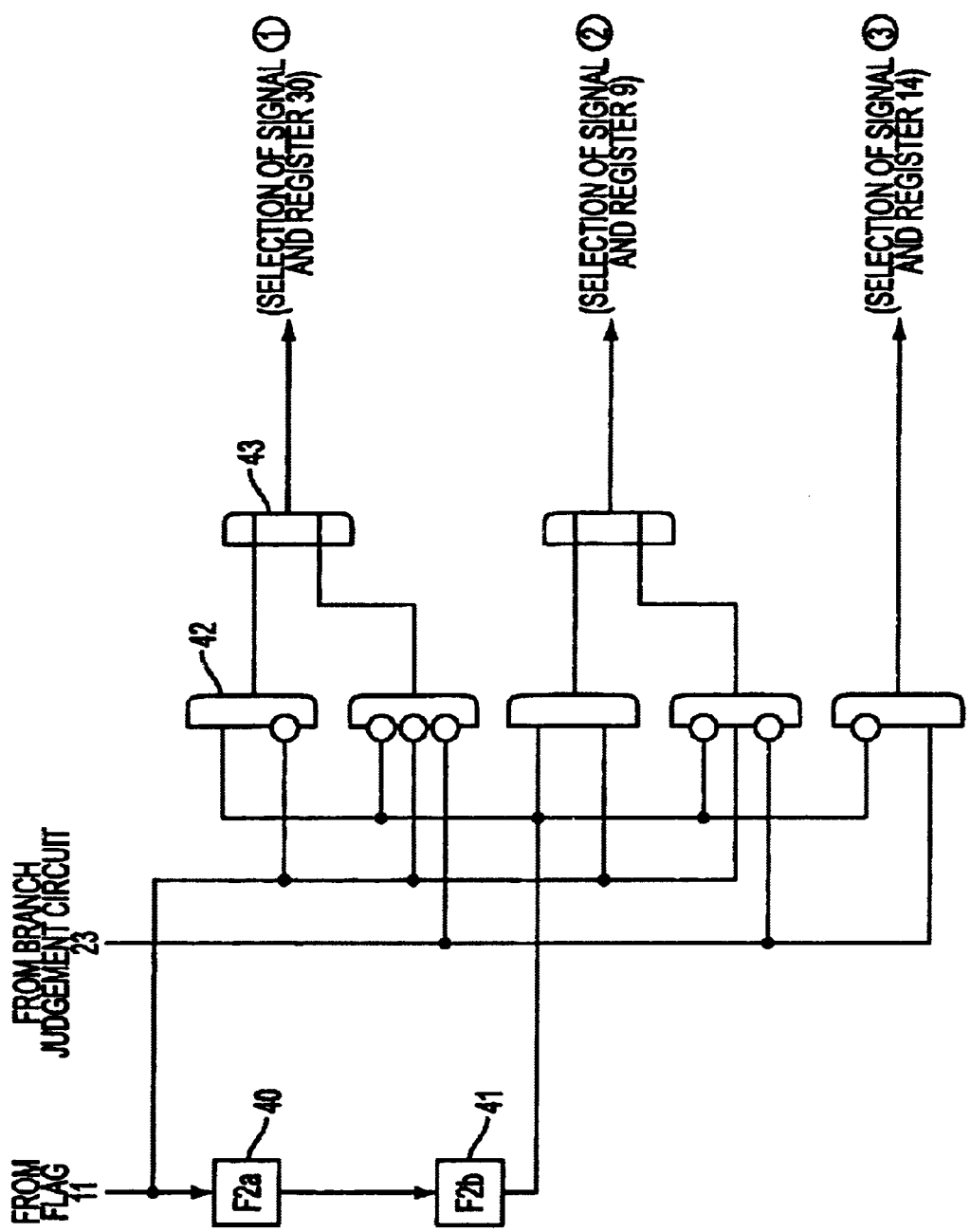
FIG. 11 is a view representing an example of a structure of the branch condition selection circuit.

Next, an example of selector 33, as shown in FIG. 11, is described. In FIG. 11, numerals 40 and 41 show flags (F2a and F2b), numeral 42 shows an AND gate and numeral 43 shows an OR gate. In selector 33 of the branch judgement circuit shown in FIG. 11, the flag 11 in FIG. 6 is further divided into a flag (F2a) 40 and a flag (F2b) 41, and is controlled to be set in flag 40 when the branch instruction is in the "B state" and to be set in flag 41 when the branch instruction is in the "E state" in accordance with the progress of the pipeline operation. The selction signal of selectors 31 and 32 shown in FIG. 6, is produced in accordance with the truth value table shown in FIG. 12.

(4) Examples of the method for predicting a branch.

(a) by an instruction code.

The instruction capable of forming a branch judgement based only on an instruction code exists among the branch instructions. This judgement can detect the non-condition branch instruction as stated above and can detect the non-condition non-branch instruction where the non-condition non-branch instruction is included in the instruction set.

(b) by a relation between a set cycle of the flag set and a branch prediction cycle.

This is conducted by detecting that the value of the flag set set by the result of the arithmetic operation, which constitutes information used for branch judgement, cannot be changed from the branch prediction cycle of the branch instruction to the original branch cycle. The branch judgement can then be conducted based on the value of the flag set.

It is necessary to detect that the value of the flag set is not changed.

In FIG. 13, the newest value of the flag set in the timing (6) cycle in which the D state of the branch prediction cycle of branch instruction Ⓑ is carried out is the value updated by the E state of operation instruction 1.

Then it is checked whether instructions 2 to 5 are the instructions which do not update the flag set. If they are, the value of the flag set in timing (6) is the same value as in timing (10), which is the original branch judgement cycle of branch instruction Ⓑ.

Therefore, the branch judgement can be carried out in timing (6).

If any of instructions 2 to 5 are instructions for updating the flag sets, the branch judgement cannot be carried out in timing (6) and is conducted in timing (10) which is the original branch judgement cycle.

The branch judgement uses the timing judgement circuit 60 (shown in FIG. 6) for detecting a timing between the production of the condition code.

In FIG. 13, instruction 1 is for updating the condition code (flag) while instructions 2, 3, 4 and 5 are not.

In the D cycle of instruction 1, the setting of the condition code is decoded by decoder 50 to be set in flag 51. The value is set sequentially in flags 52, 53, 54 and 55 in accordance with the execution of instruction 1.

On the other hand, instructions 2, 3, 4 and 5 are respectively decoded in the D cycle as instructions for preventing the condition codes from being set and the resultant state is set in flag 51.

As a result, in timing (6), which is the first branch judgement cycle of branch instruction Ⓑ, the setting of the condition code for instruction 1, i.e., the existance of the updating is set in flag 55. However, flag 54 is set so that instruction 2 does not update the condition code, flag 53 is set so that instruction 3 does not update the condition code, flag 52 is set so that instruction 2 does not update the condition code, and flag 51 is set so that instruction 5 does not update the condition code.

Timing judgement condition 60 judges whether the branch judgement can be conducted based on the condition code in the D cycle by branch instruction B, taking into consideration the values of the above flags. Namely, where flags 51, 52, 53 and 54 all show that the condition code is not updated, the branch instruction B can perform the branch judgement based on the condition code in the D cycle using branch judgement circuit 5 as shown in FIGS. 10A and 10B. Conversely, updating of the condition code occurs after the timing (6), namely, after the D cycle of the branch instruction B. For example, when flag 52 indicates updating, instruction 4 performs a updating in timing (8) in E cycle. The branch judgement cannot be conducted by using the condition code in timing (6).

(c) based on the branch prediction by a counter branch instruction.

The counter branch instruction performs subtraction of the value of the designated general register and determines that the branch is successful, when the result is other than 0, and is used for forming a do-loop for a high class instruction. Namely, the do-loop is repeated untill a content of the counter formed by the general register 6 and the arithmetic logical unit becomes "0", thereby repeatedly performing the branch to a head address of the do-loop. When the value of the counter becomes "0", the do-loop is completed and the process proceeds to an address following the last address of the do-loop. Therefore, in case of the counter branch instruction, the present invention makes it possible to prefetch the instruction following the branch target instruction of the counter branch instruction, thereby enabling the do-loop to be performed at a high speed.

In this type of branch instruction, the value to be subtracted is usually "1". Thus, the branch is successful where the value to be read out from the general register is other than "1".

FIG. 10C checks whether or not the branch judgement should be conducted based on the content of general register 6. In the branch cycle, the value stored in general register 6 is read out through line 5' (shown in FIG. 6) to branch judgement circuit 5 and then it is checked whether or not the value is "1". Namely, in the counter branch instruction, the content of general register 6 is subjected to a subtraction. When it is detected by AND circuit 93 in judging circuit 81' (shown in FIG. 10A) that the result of the subtraction is not "0000 0001" of hexa decimal number in case of 32 bit buffer register 6, NAND 94 of the judging circuit 81' output "1" to be supplied to AND circuit 84'. Therefore, in this case, branch judgement cricuit 5 can perform a predictable branch judgement based on the content of general register 6. However, in this case, it is necessary to detect that the value of the general register is not changed from the branch prediction stage to the original judgement stage. As recited above, this judgement can be conducted by decoder 50'; flags 51', 52', 53', 54' and 55'; and timing cirucit 60', shown as a dotted line in FIG. 6 in the same manner as the decoder 50; flags 51 to 54; and timing circuit 60.

In accordance with the present invention, when executing a branch instruction where the branch can be predicted, there is the possibility that the execution of the instruction following the branch target instruction is kept waiting. Though depending on the ratio of the number of non-condition instructions 2 to the number of instructions to be executed, the possibility of the branch instruction being high, greatly increases the total capability.

What is claimed is:

1. An instruction fetch control system for performing a prefetch of an instruction having a decode cycle in a pipeline system and a fetch of a branch target instruction of a branch instruction, comprising:
   a first branch judgement circuit judging whether a branch condition exists indicating either that a non-condition branch is established or a branch is predictable in a preliminary stage prior to a branch judgement stage in said pipeline system, for every branch instruction executed by said pipeline system; and
   a start circuit starting a prefetch of instructions following each branch target instruction without waiting for the branch judgement stage of the branch instruction in said pipeline system, when said first branch judgement circuit judges that the branch condition exists, and
   said first branch judgement circuit comprising:
      a decoding circuit decoding an instruction code for determining whether a condition branch or non-condition branch exists,
      a check circuit determining that a plurality of instructions continuing from an immediately prior instruction of the branch instruction do not update a condition code,
   a branch instruction selection circuit selecting a branch instruction which can be judged as the branch prior to the branch judgement stage, based on a combination of the instruction code and the condition code, and
   a judging circuit judging that the branch instruction is predictable where said decoding circuit decodes the branch condition, said judging circuit judges that the condition code is not updated in a plurality of cycles continued from an immediately preceding cycle, and said branch instruction selection circuit selects the instruction which becomes the branch instruction.

2. The instruction fetch control system according to claim 1, wherein said first branch judgement circuit determines that the branch instruction is a counter branch instruction operating on a value stored in a general register and judging the branch condition to exist when the result is a predetermined value, and checking whether the value of said general register is the predetermined value.

3. The instruction fetch control system according to claim 1, further comprising:
   a content circuit determining that a content of an instruction decoder is a counter branch instruction;
   an update circuit determining that a predetermined number of the plurality of instructions continuing from the branch instruction do not update a content of a general register;
   a value circuit determining that the content of the general register designated by the branch instruction is not the predetermined value; and
   a check circuit determining that the counter branch instruction is predictable when the condition of all content, update and value circuits are established.

4. An instruction fetch control system for performing a prefetch of an instruction having a decode cycle in a pipeline system and a fetch of a branch target instruction of a branch instruction, comprising:
   a first branch judgement circuit judging whether a branch condition exists indicating either that a non-condition branch is established or a branch is predictable in a preliminary stage prior to a branch judgement stage in said pipeline system, for every branch instruction executed by said pipeline system; and a start circuit starting a prefetch of instructions following each branch target instruction without waiting for the branch judgement stage of the branch instruction in said pipeline system, when said first branch judgement circuit judges that the branch condition exists, and said first branch judgement means comprising:

- a decoding circuit decoding an instruction code to decode a condition branch or non-condition branch,
- a first determining circuit determining that a plurality of continuing instructions immediately preceding the branch instruction do not update a condition code upon a first judgement in the first branch judgement circuit,
- a second determining circuit determining that a plurality of continuing instructions immediately preceding the branch instruction does not update a general register upon the first judgement in the branch judgement circuit, and
- a judging circuit performing a branch judgement in a cycle prior to an original second branch judgement when the branch instruction is a non-condition branch, when the branch instruction is necessary for performing the branch judgement based on the instruction code and condition code, and when the branch is predictable by said first determining circuit; or when the branch instruction is necessary for performing the branch judgement based on the value of the general register and when the branch is predictable by said second determining circuit.

5. An instruction fetch control system for performing a prefetch of an instruction having a decode cycle in a pipeline system and a fetch of a branch target instruction of a branch instruction, comprising:

- a first branch judgement circuit judging whether a branch condition exists indicating either that a non-condition branch is established or a branch is predictable in a preliminary stage prior to a branch judgement stage in said pipeline system, for every branch instruction executed by said pipeline system;
- a prefetch start circuit starting a prefetch of instructions following each branch target instruction without waiting for the branch judgement stage of the branch instruction in said pipeline system, when said first branch judgement circuit judges that the branch condition exists; and
- a second branch judgement circuit judging from the condition code whether the branch should be conducted in an original judgement cycle; and
- wherein said prefetch start circuit comprises a selector circuit selecting registers for storing address information for fetching an instruction following the branch instruction, or an instruction following the branch target instruction, based on the result of the first branch judgement circuit and the result of said second branch judgement circuit.

6. The instruction fetch control system according to claim 5, wherein said selector circuit comprises a branch condition selecting circuit selecting an ordinary branch instruction or a predictable branch instruction based on said first and second branch judgement circuits, an address information selection circuit selecting the address information, and an instruction length selection circuit selecting an instruction length of the instruction to be selected.

* * * * *

UNITED STATES PATENT AND TRADEMARK OFFICE
CERTIFICATE OF CORRECTION

PATENT NO. : 6,631,464 B1  
DATED : October 7, 2003  
INVENTOR(S) : Tsuyoshi Mori et al.

It is certified that error appears in the above-identified patent and that said Letters Patent is hereby corrected as shown below:

<u>Title page,</u>
Add item -- [30]    Foreign Application Priority Data
            December 27, 1998    (JP) ..................... 63-327765 --
Item [56], References Cited, FOREIGN PATENT DOCUMENTS, add
-- JP    61-243536    10/1986 --

Signed and Sealed this

Ninth Day of March, 2004

JON W. DUDAS  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,631,464 B1 | Page 1 of 1 |
| APPLICATION NO. | : 08/826990 | |
| DATED | : October 7, 2003 | |
| INVENTOR(S) | : Tsuyoshi Mori et al. | |

It is certified that error appears in the above-identified patent and that said Letters Patent is hereby corrected as shown below:

<u>Title page,</u>
Add item -- [30]      Foreign Application Priority Data
           December 27, 1988      (JP) ..................... 63-327765 --
Item [56], References Cited, FOREIGN PATENT DOCUMENTS, add
-- JP     61-243536       10/1986 --

This certificate supersedes Certificate of Correction issued March 9, 2004.

Signed and Sealed this

Twelfth Day of September, 2006

JON W. DUDAS
*Director of the United States Patent and Trademark Office*